UNITED STATES PATENT OFFICE.

ROBERT WAHL AND ARNOLD S. WAHL, OF CHICAGO, ILLINOIS.

FOOD PRODUCT AND PROCESS OF PREPARING SAME.

1,179,877.  Specification of Letters Patent.  Patented Apr. 18, 1916.

No Drawing.   Application filed July 6, 1915. Serial No. 38,180.

*To all whom it may concern:*

Be it known that we, ROBERT WAHL and ARNOLD S. WAHL, citizens of the United States, residing at Chicago, in the county of Cook and State of Illinois, have invented a new and useful Improvement in Food Products and Processes of Preparing the Same, of which the following is a specification.

Our invention relates to certain improvements in the art of preparing aerated or raised farinaceous foods, such as bread, or the like.

It is a particular object of our invention to improve the qualities of such foods, and more particularly to effect an improvement in the elasticity or texture of the crumb.

It is a further object of our invention to attain other desirable qualities in the food by modifying or acting upon the glutinous substances or constituents of the flour entering into the composition of the baked goods. The gluten of the flour, which consists mainly of the two constituents, glutenin and gliadin, we have found to be partially digested by means of our improvements, one of the most noteworthy effects of such treatment being the greater elasticity of the crumb, as mentioned above. For the purpose of effecting this digestion or alteration in the property of the gluten, we make use of any of the well-known proteolytic enzyms, such as pepsin, papain, bromelin, or peptase of malt. Pepsin and papain are particularly suitable, because these enzyms are readily obtainable on the market at a reasonable cost, and the quantity needed to attain the desired result is quite minute, about one gram of pepsin, for instance, being sufficient to treat about two hundred loaves of bread.

In preparing the bread dough, according to our improved method, the proteolytic enzym, such as pepsin, is mixed with flour, water, salt, and other ingredients in the preparation of the dough. The digestive effect of the pepsin, papain, or other enzym, is had during the so-called fermentation process of the dough, in which process temperatures approximating 100° F. are ordinarily employed, which are favorable to the action of the enzyms.

It is well understood that the activity of pepsin, is considerably enhanced in slightly acid media, and for this reason we prefer to employ together with the pepsin in the preparation of our dough, an acid such as lactic acid, which, for the attainment of the best results, should be prepared and used according to the manner set forth in our application, Serial No. 2546, filed Jan. 16, 1915. The lactic acid itself should preferably be prepared as a sour liquid, according to the method disclosed in Letters Patent of the United States, No. 1,028,508, dated June 4, 1912, and issued to Robert Wahl, one of the present applicants. In this patent it is shown that wheat bran is preferably used as a base in the production of the lactic acid, which latter is propagated through the activity of lactic acid bacteria with which the wheat bran mash has been inoculated, using about 20 to 50 parts of bran with about 15 to 25 parts of sugar, and about 1000 parts of water, the mash being heated to about 55° C., then inoculated with lactic acid bacteria, such inoculation being preferably effected by adding a portion of an acidulated mash previously produced in the same manner. After inoculation, the mash is held at a temperature of between 45° and 55° C., or thereabout, until the extent of acidulation is one to two per cent., which result will be obtained in from 24 to 48 hours. About 40 to 70 parts of this acidulated liquor is added in mixing the materials for the dough, including the flour, water, yeast, salt and other ingredients, as desired, for 500 parts, by weight, of finished bread. Volumetrically, the proportion should be approximately 6 gallons of the lactic liquor per 500 loaves of finished bread. The addition of this acid in itself, without the use of pepsin or other proteolytic enzym has a very desirable effect on the bread, improving the appearance of the crust in color and bloom, improving the crumb as to its uniformity in texture and color, attaining a greater whiteness where the resultant product is white bread, effecting an increase in the size and weight of the bread, the more uniform distribution of the gas cells throughout the mass, attaining smaller cells in augmented number in the crumb and avoiding holes or, at least, in materially decreasing the size of the holes, giving a less crumby and less doughy but more velvety crumb, and a better flavor to the bread. This improvement in the flavor may be expected by reason of the retarding effect of the lactic acid upon foreign ferments, which enables the baker to avoid obnoxious odors from their development and also an augmented palatability due to the effect of the acid in changing the alkaline tribasic phosphates, into acid phosphates, which latter lend zest and appetizing qualities to the bread and improve its wholesomeness and render it more readily digestible. Besides these latter results the slight acidity attained through these acid phosphates serves further to enhance the activity of the proteolytic enzyms, thereby increasing their digestive effect upon the glutinous matter of the bread, and further improving the quality of the crumb.

While, as before stated, pepsin or papain, or any other suitable proteolytic enzym may thus be employed, either alone, or together with lactic acid, we prefer to employ peptase of malt for the purposes of our invention. The peptase of malt does not exist in a free condition, but must be activated in order to yield proper results, as is shown in the address of Robert Wahl, one of the present applicants, before the eighth International Congress of Applied Chemistry, reported in the original communication thereof, Vol. XIV, page 215.

It is found that the most suitable acid and the one having the greatest effect in activating the peptase, is a lactic acid prepared in accordance with Letters Patent No. 1,006,154, dated Oct. 17, 1911, in which is contained a full disclosure of the treatment of malt to obtain the activity of the peptase, which was employed in the patent referred to for the purpose of digesting colloidal albumen contained in beer to enhance its keeping quality and its zest, besides giving to the beer other desirable properties, as there fully disclosed. For preparing a lactic acid for the use of our present process, the procedure may be as follows: Crushed malt is used, from which the husks may be sifted out, and this crushed malt is treated with four parts, by weight, of lactic acid propagated as above, and of the strength of one per cent, the mash of malt and acid being made at a temperature of about 25° C. The mash so obtained is left standing for one-half hour, at the end of which time the liquor may be drained off and used as such in the proportion of 10 parts to 500 parts of finished bread, the only difference otherwise made in the proportions of the dough being that the water content is reduced by 10 parts, the lactic acid being, in fact, substituted for this water. Besides all the advantages obtained as above described, the malt itself, containing some sugar and some diastase will improve the dough and the fermentation of the same by furnishing a highly desirable yeast food, whereby the yeast is stimulated to more rapid growth and to a more abundant production of carbonic acid gas.

For the attainment of the best results in our improved process, a number of precautions should be used in preparing the said acid extracted substances of malt containing the peptase of malt in a state of activity, diastase, and other extracted substances. Among these precautions may be mentioned the accurate regulation of the temperature of the acid mash. This temperature should not materially exceed 21° C., as the activated peptase tends to use itself up in the auto-digestion of the proteids of the malt at temperatures substantially exceeding that given, it being found that the nearer the temperature approaches 45° C., which is the optimum, the greater the activity of the peptase. A further precaution which may be mentioned relates to the degree of acidity of the liquor which should not be of a strength substantially greater than one per cent., as the action of the peptase will be unduly enhanced by greater acidity than that mentioned, and the peptase thereby permitted to spend itself.

In the foregoing specification, we have particularly described the procedure employed in carrying out our process in its preferred form. It will be recognized, however, that these details of procedure are not by any means essential, but relate wholly to the attainment of the most perfect results and under the particular conditions which have existed in our practise of the process. Our invention, however, is not to be regarded as limited in scope to the refinements of procedure mentioned, except in so far as we have included such limitations within the terms of the following claims, in which it is our intention to claim all novelty inherent in our invention in as broad a manner as is possible in view of the prior art.

We claim:

1. The process of preparing farinaceous foods of the character of bread, which consists in adding to a dough an acid substance and a proteolytic enzym, maintaining the dough at a temperature favoring the activity of the enzym, and baking the said dough.

2. The process of preparing farinaceous foods of the character of bread, which consists in adding to a dough lactic acid and a proteolytic enzym, maintaining the dough at a temperature favoring the activity of the enzym, and baking the dough.

3. The process of preparing farinaceous foods of the character of bread, which consists in adding to a dough lactic acid and the peptase of malt, maintaining the dough at a temperature favoring the activity of the peptase, and baking the dough.

4. The process of preparing farinaceous foods of the character of bread, which consists in adding to a dough lactic acid and the peptase of malt, maintaining the dough at a temperature favoring the activity of the peptase, and baking the dough.

5. The process of preparing farinaceous foods of the character of bread, which consists in adding to a dough the acid extracted substances of malt and the peptase of malt in a state of activity, maintaining the dough at a temperature favoring the activity of the peptase, and baking the dough.

6. The process of preparing farinaceous foods of the character of bread, which consists in mixing with the ingredients of the dough a liquor containing the acid extracted substances of malt and the peptase of malt in a state of activity, forming a dough from said mixture, maintaining the said dough at a temperature favoring the activity of the peptase, and baking the said dough.

7. The process of preparing farinaceous foods of the character of bread, which consists in mixing with the ingredients of the dough, lactic acid liquor of an acidity of about one per cent. and containing peptase of malt, forming said ingredients into a dough, maintaining the dough at a temperature favoring the activity of the peptase, and baking the said dough.

8. A dough of the character described obtained by adding lactic acid and a proteolytic enzym, the latter being in a state of activity.

9. A dough of the character described containing the acid extracted substances of malt, including the peptase of malt in a state of activity.

10. A dough of the character described containing an acid substance and peptase of malt in a state of activity.

11. A dough of the character described obtained by adding to the dough constituents an acid substance of an acidity of about one per cent., and the peptase of malt.

ROBERT WAHL.
ARNOLD S. WAHL.

In presence of—
A. C. FISCHER,
K. O'NEILL.